US012193603B2

(12) United States Patent
Wang et al.

(10) Patent No.: US 12,193,603 B2
(45) Date of Patent: Jan. 14, 2025

(54) AIR FRYER AND CLEANING METHOD THEREOF

(71) Applicant: Shenzhen Hesung Innovation Technology Co., Ltd., Shenzhen (CN)

(72) Inventors: ChengXiang Wang, Shenzhen (CN); AiMin He, Shenzhen (CN); XiangHe Zhang, Shenzhen (CN)

(73) Assignee: Shenzhen Hesung Innovation Technology Co., Ltd., Shenzhen (CN)

( * ) Notice: Subject to any disclaimer, the term of this patent is extended or adjusted under 35 U.S.C. 154(b) by 623 days.

(21) Appl. No.: 17/546,041

(22) Filed: Dec. 8, 2021

(65) Prior Publication Data

US 2022/0395137 A1 Dec. 15, 2022

(30) Foreign Application Priority Data

Jun. 10, 2021 (CN) .......................... 202110648966.6

(51) Int. Cl.
*A47J 37/06* (2006.01)
(52) U.S. Cl.
CPC ....... *A47J 37/0641* (2013.01); *A47J 37/0664* (2013.01)

(58) Field of Classification Search
CPC .... A37J 37/06; A37J 37/0629; A37J 37/0641; A37J 37/0664
See application file for complete search history.

(56) References Cited

U.S. PATENT DOCUMENTS

2021/0298512 A1* 9/2021 Zhang ..................... A47J 27/04
2022/0369862 A1* 11/2022 Zhang ..................... F24C 7/067

FOREIGN PATENT DOCUMENTS

| CN | 203524502 U | * | 4/2014 |
| CN | 206166702 U | * | 5/2017 |
| CN | 213909846 U | * | 8/2021 |
| CN | 214964645 U | * | 12/2021 |

* cited by examiner

*Primary Examiner* — Hung D Nguyen
(74) *Attorney, Agent, or Firm* — David & Raymond Patent Firm; Raymond Y Chan

(57) ABSTRACT

An air fryer for air-frying a food includes a main body having an air frying chamber for receiving a food therein, an air circulation device disposed in the main body for guiding an air flow into the air frying chamber of the main body, and an air heater which includes a heating coil detachably coupled at the main body for heating the air flow to form a hot air in the air frying chamber so as to air-fry the food therein.

15 Claims, 11 Drawing Sheets

| Detach the heating coil of the air heater of the air fryer from the air frying chamber of the main body of the air fryer | — S100 |

| Remove grease stains on the inner wall surface of the air frying chamber and the outer surface of the heating coil after the heating coil detached | — S200 |

| Couple the heating coil back into the air frying chamber after the heating coil and the air frying chamber are cleaned | — S300 |

FIG. 13

AIR FRYER AND CLEANING METHOD THEREOF

CROSS REFERENCE OF RELATED APPLICATION

This is a non-provisional application that claims priority under 35 U.S.C. § 119 to Chinese application number CN 202110648966.6, filed and Jun. 10, 2021, the entire contents of each of which are expressly incorporated herein by reference.

BACKGROUND OF THE PRESENT INVENTION

Field of Invention

The present invention relates to a kitchen appliance, and more particularly to an air fryer and a cleaning method thereof.

Description of Related Arts

An air fryer is a kitchen appliance that cooks food, such as French fries, vegetables or meat, by circulating hot air instead of frying the food by boiling oils in a cooking pan. Through the circulating hot air in a food basket of the air fryer, moisture on the food surface will be removed to brown the food so as to achieve the conventional frying effect. Since the air fry is able to not only reduce the amount of fat in the food but also keep the frying qualities of the food, such as the appearance and taste of the fried food. Therefore, the air fryers are so popular and have great commercial values.

The existing air fryer generally comprises a frying basket for the food placing therein, a heating coil cover covering on the frying basket, a heating coil mounted at the heating coil, and a fan for generating an airflow into the frying basket. Accordingly, when the existing air fryer is operated to air fry the food, the heating coil is activated to heat up surrounding air to form the hot air, such that the fan will blow and circulate the hot air into the frying basket so as to gradually increase the air temperature in the air fryer. At the same time, moisture and fat of the food will be released and fried by the hot air to cook the food in the frying basket. Then, the hot air carrying the moisture and grease will be discharged from the frying basket to the air outlet of the air fryer.

However, while discharging the hot air, grease in the hot air will inevitably contact and adhere to an inner surface of the heating coil cover and an outer surface of the heating coil. Once the air fryer stop operating, the air temperature in the air fryer will drop and the hot air will stop circulating. As a result, the grease will be solidified to retain on the inner surface of the heating coil cover and the outer surface of the heating coil. After the frequent use of the air fryer, more and more oil will be accumulated on the inner surface of the heating coil cover and the outer surface of the heating oil to form grease stains. These grease stains not only affect the heating efficiency of the heating coil but also allow bacteria growing to contaminate the food in the frying basket, such that safety and hygienic issues are concerned by the users.

In order to ensure food safety and better heating efficiency of the heating coil, it is recommended for the user to frequently clean the air fryer to remove the grease stains on the heating coil cover and the heating coil. Since the heating coil is configured in a spiral shape and is affixed in the inner side of the heating coil cover, not only some hidden spots on the heating coil covered by the heating coil cover but also some hidden areas on the inner surface of the heating coil cover hidden at the heating coil cannot be cleaned. Therefore, in order to thoroughly clean the grease stains in the air fryer, a professional cleaning technician is required to provide on-site service to disassemble the air fryer and thoroughly clean the grease stains at the hidden spots on the heating coil and the hidden areas on the inner surface of the heating coil cover. Such on-site service is costly and time-consuming, wherein usually appointments are required in advance. for the users, it's hard to accept such kind of on-site service.

SUMMARY OF THE PRESENT INVENTION

The invention is advantageous in that it provides an air fryer and a cleaning method thereof, in which accumulation of grease stains of the air fryer can be reduced and the safety of the air fryer can be improved.

Another advantage of the invention is to provide an air fryer and a cleaning method thereof, wherein the user is able to easily clean the outer surface of the heating coil and the inner wall surface of the air frying chamber so as to address the safety and health issues due to the accumulation of grease stains.

Another advantage of the invention is to provide an air fryer and a cleaning method thereof, wherein the heating coil can be detached from the air frying chamber, such that the user is able to clean the detached heating coil easily and time efficiency.

Another advantage of the invention is to provide an air fryer and a cleaning method thereof, wherein the air fryer is coated with a non-stick coating to reduce the grease stains adhered to the inner wall surface of the air frying chamber and to allow the air frying chamber to be cleaned easily.

Another advantage of the invention is to provide an air fryer and a cleaning method thereof, wherein the grease stains can be easily removed from the air fryer to ensure safety and hygienic concern.

Another advantage of the invention is to provide an air fryer and a cleaning method thereof, wherein the heating coil can be assembled and disassembled in a tool-less manner, such that the user is able to install and detach the heating coil to and from the air frying chamber without using any tool, so as to simplify the assembling operation and reduce the cleaning cost of the air fryer.

Another advantage of the invention is to provide an air fryer and a cleaning method thereof, wherein no expensive or complicated structure is required to employ in the present invention in order to achieve the above-mentioned objects. Therefore, the present invention successfully provides an economic and efficient solution for easily cleaning the air frying and for enhancing the practicability and reliability of the air fryer.

According to the present invention, the foregoing and other objects and advantages are attained by an air fryer for air-frying a food, comprising:

a main body having an air frying chamber for receiving the food therein;

an air circulation device disposed in the main body for guiding an air flow to circulate in the air frying chamber of the main body; and an air heater which comprises a heating coil detachably coupled at the main body for heating the air flow to form a hot air in the air frying chamber so as to air-fry the food therein.

In one embodiment, the main body comprises a housing having an interior cavity, a cover assembly and an air frying assembly, wherein the cover assembly is disposed in the interior cavity of the housing to divide the interior cavity into the air frying chamber and a component chamber, wherein the air frying assembly is disposed in the housing for holding the food in the air frying chamber.

In one embodiment, the air frying assembly is detachably coupled at the housing.

In one embodiment, the air frying assembly comprises a basket having at least one basket opening, wherein the basket is arranged for holding the food therein to be placed in the air frying chamber when the basket is coupled to the housing.

In one embodiment, the air heater further comprises a power supply supported in the main body within the component chamber thereof to electrically connect to the heating coil, wherein the heating coil is located at the air frying chamber of the main body, wherein when the heating coil is detachably coupled at the cover assembly, the heating coil is electrically connected to the power supply so as to electrically power up the heating coil by the power supply.

In one embodiment, the power supply comprises a power port provided at the cover assembly, wherein the heating coil comprises a coil body and a power connector integrally coupled to the coil body, wherein the power connector is detachably connected to the power port in order to electrically connect the coil body to the power supply.

In one embodiment, the main body further comprises one or more detachable holders provided at the cover assembly to detachably couple the heating coil at the cover assembly.

In one embodiment, the detachable holder comprises a supporting element movably coupled at the cover assembly to move between a supporting position and a releasing portion, wherein when the supporting element is moved at the supporting position, the coil body is supported by the supporting element to stably retain the heating coil in the air frying chamber, and when the supporting element is moved at the releasing position, the coil body can be detached from the supporting element, such that the heating coil can be detached from the air frying chamber.

In one embodiment, the detachable holder further comprises a restoring element coupled between the supporting element and the cover assembly for applying a restoring force to the supporting element so as to move the supporting element from the releasing position back to the supporting position.

In one embodiment, the restoring element comprises a spring, wherein the supporting element has a sliding end and a hooking end extended from the sliding end, wherein the sliding end of the supporting element is slidably coupled at the cover assembly while the hooking end of the supporting element is extended toward the air frying chamber to detachably engage with the coil body of the heating coil.

In one embodiment, the main body further comprises a blocking assembly provided at the power connector of the heating coil, wherein after the power connector of the heating coil is connected to the power port of the power supply, the power port is sealed by the blocking assembly.

In one embodiment, the blocking assembly comprises a sealing gasket and a hand screw, wherein the sealing gasket is provided at the power connector of the heating coil, wherein after the power connector of the heating coil is inserted into the power port of the power supply, the sealing gasket is tightly mounted at the power port by the hand screw.

In one embodiment, the detachable holder comprises a magnetic element provided at the coil body of the heating coil, such that the heating coil is detachably mounted at the cover assembly by means of magnetic attraction.

In one embodiment, the air circulation device comprises an electric motor and a fan blade assembly being driven to rotate by the electric motor, wherein the electric motor is supported at the component chamber of the main body, wherein the fan blade assembly comprises a first fan blade supported at the air frying chamber and driven to rotate by the electric motor for circulating the air within the air frying chamber.

In one embodiment, the cover assembly comprises an inner cover and an outer cover, wherein the inner and outer covers are spaced apart from each other and are disposed in the interior cavity of the housing to form an intermediate chamber between the air frying chamber and the component chamber, wherein the fan blade assembly comprises a second fan blade disposed in the intermediate chamber, wherein the second fan blade is drive to rotate by the electric motor.

In one embodiment, the intermediate chamber of the main body is communicated with the component chamber thereof, wherein the main body further has at least one air inlet provided at the housing to communicate with the component chamber, and at least one first air outlet provided at the housing to communicate with the intermediate chamber.

In one embodiment, the main body further has second air outlet provided at the housing to communicate with the air frying chamber, wherein the second air outlet is located adjacent to the first air outlet.

In one embodiment, the inner cover has an air outlet passage extended from the air frying chamber to the second air outlet.

In one embodiment, the inner cover further has a covering portion and a communicating portion, wherein the covering portion of the inner cover forms a ceiling of the air frying chamber while the communicating portion is integrally extended from the covering portion to the second air outlet of the housing to form the air outlet passage.

In one embodiment, a side wall of the communicating portion of the inner cover is tangent to a peripheral wall of the covering portion thereof.

In one embodiment, the covering portion of the inner cover of the cover assembly has a stepping structure to define a first receiving cavity for receiving the first fan blade and a second receiving cavity for receiving the heating coil, wherein the first receiving cavity is located above and communicated with the second receiving cavity, wherein a diameter of the second receiving cavity is larger than a diameter of the first receiving cavity.

In one embodiment, the air fryer further comprises a non-stick coating partially or entirely provided at an inner wall surface of the air frying chamber of the main body.

In one embodiment, the air fryer further comprises a non-stick coating provided on an outer surface of the coil body of the heating coil.

In one embodiment, the air fryer further comprises a non-stick coating provided on an inner surface of the inner cover of the cover assembly.

In one embodiment, the air fryer further comprises a non-stick coating provided on an outer surface of the first fan blade of the fan blade assembly.

In accordance with another aspect of the invention, the present invention comprises a cleaning method of an air fryer, comprising the steps of:

detaching the heating coil of the air heater of the air fryer from the air frying chamber of the main body of the air fryer;

removing grease stains on the inner wall surface of the air frying chamber and the outer surface of the heating coil after the heating coil detached; and coupling the heating coil back into the air frying chamber after the heating coil and the air frying chamber are cleaned.

In one embodiment, the non-stick coating is partially or completely coated on the inner wall surface of the air frying chamber.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 13 is a flow chart illustrating a cleaning operation of the air fryer according to the above first and second preferred embodiments of the present invention.

DETAILED DESCRIPTION OF THE PREFERRED EMBODIMENT

Figure 1:
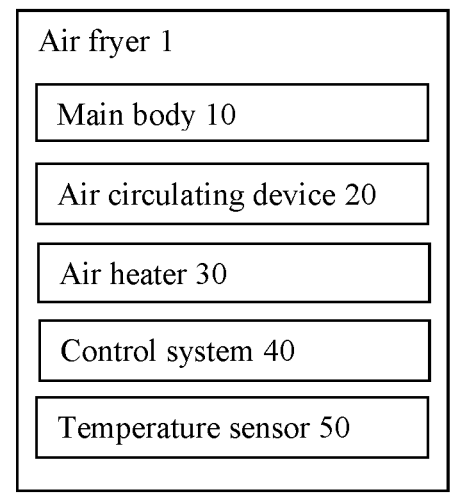
FIG. 1 is a block diagram illustrating an air fryer according to a first preferred embodiment of the present invention.
Figure 2:
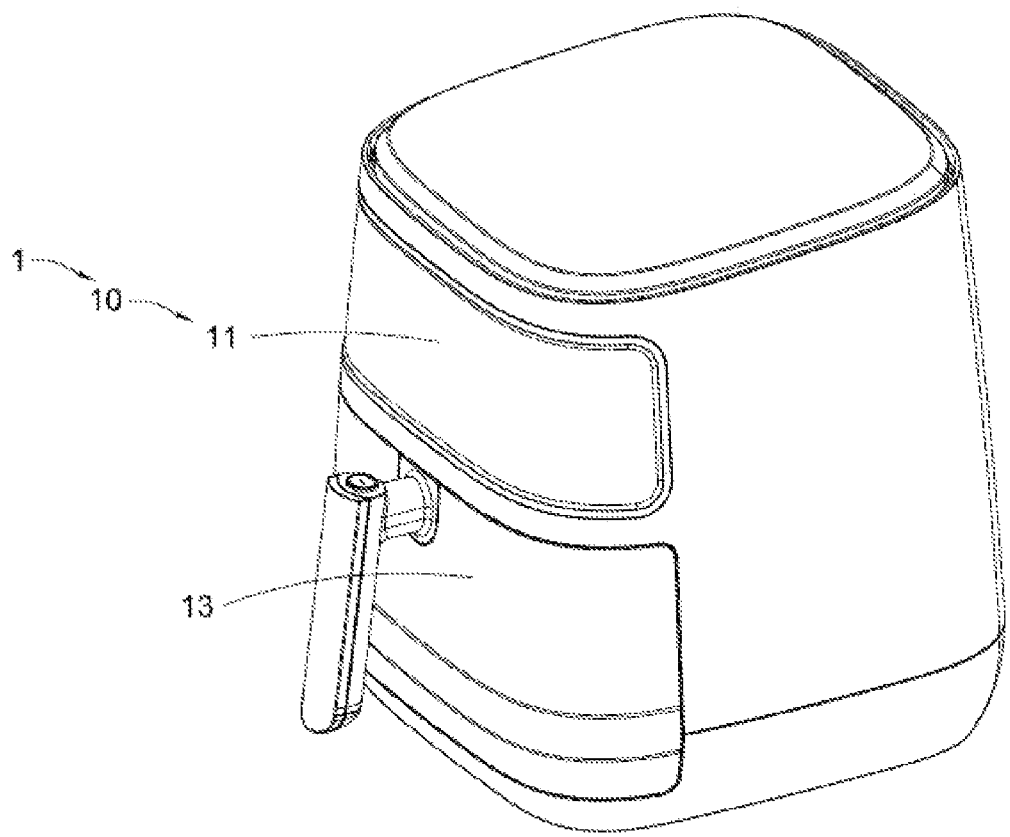
FIG. 2 is a perspective view of the air fryer according to the above first preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

It is appreciated that the terms "longitudinal", "transverse", "upper", "lower", "front", "rear", "left", "right", "vertical", "horizontal", "top", "bottom", "interior" and "exterior" in the following description refer to the orientation or positioning relationship in the accompanying drawings for easy understanding of the present invention without limiting the actual location or orientation of the present invention. Therefore, the above terms should not be an actual location limitation of the elements of the present invention.

It is appreciated that the terms "one" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

Accordingly, the existing air fryer is constructed by connecting the heating coil to a circuit board via a wire and affixing the heating coil at the heating coil cover in a non-detachable manner. During the operation of the existing air fryer to generate the hot air for cooking the food, smoke and grease will be generated by the food. The smoke and grease will be discharged from the existing air fryer along an air duct of the heating coil cover via the operation of the fan. However, the grease will inevitably adhere to the heating coil cover and the surface of the heating coil during the discharging process. As more often the operation of the air fryer to cook the foods, increasing amount of grease will be attached on the heating coil cover and the surface of the heating coil. Since the heating coil is mounted at the heating coil cover in a non-detachable manner, it is difficult to clean the grease on the heating coil cover and the heating coil. This is the common drawback of the existing air fryers.

In order to solve the above problem, the present invention provides an air fryer and its production method thereof to easily clean the grease stain through a detachable structure or a non-stick coating, so as to ensure the safety and health of the air fryer during the cooking operation. It is understood that the food to be fried mentioned in the present invention can be foods such as French fries, vegetables, meats, fishes, or etc. It is appreciated that inedible industrial products can be placed in the air fryer of the present invention for surface heating, and it should not be limited in the present invention.

Referring to FIGS. 1 to 8 of the drawings, an air fryer according to a first preferred embodiment of the present invention is illustrated, wherein the air fryer is able to air fry the food via hot air. Particularly, the air fryer 1 comprises a main body 10, an air circulation device 20, and an air heater 30. The main body 10 has an air frying chamber 101 for the food placing therein. The air circulation device 20 is supported in the main body 10 for driving an air flow into the air frying chamber 101 of the main body 10. The air heater 30 comprises a heating element 31 detachably coupled in the main body 10 at a position in the air frying chamber 101 thereof, wherein the heating element 31 is configured for heating up the air flow to form hot air so as to air-fry the food in the air frying chamber 101.

It is worth mentioning that since the heating element 31 is detachably coupled in the main body 10 and is located in the air frying chamber 101, the heating element 31 can be easily detached from the main body 10 in order to clean the air frying chamber 101 of the main body 10. Since an inner wall of the air frying chamber 101 will not be blocked by the heating element 31, grease stains on the inner wall of the air frying chamber 101 can be easily cleaned. Meanwhile, grease stains on the heating element 31 can be easily cleaned when the heating element 31 is detached from the main body 10. Therefore, the user is able to easily clean the air fryer 1 to ensure the safety and health of the air fryer during the cooking operation.

Figure 3:
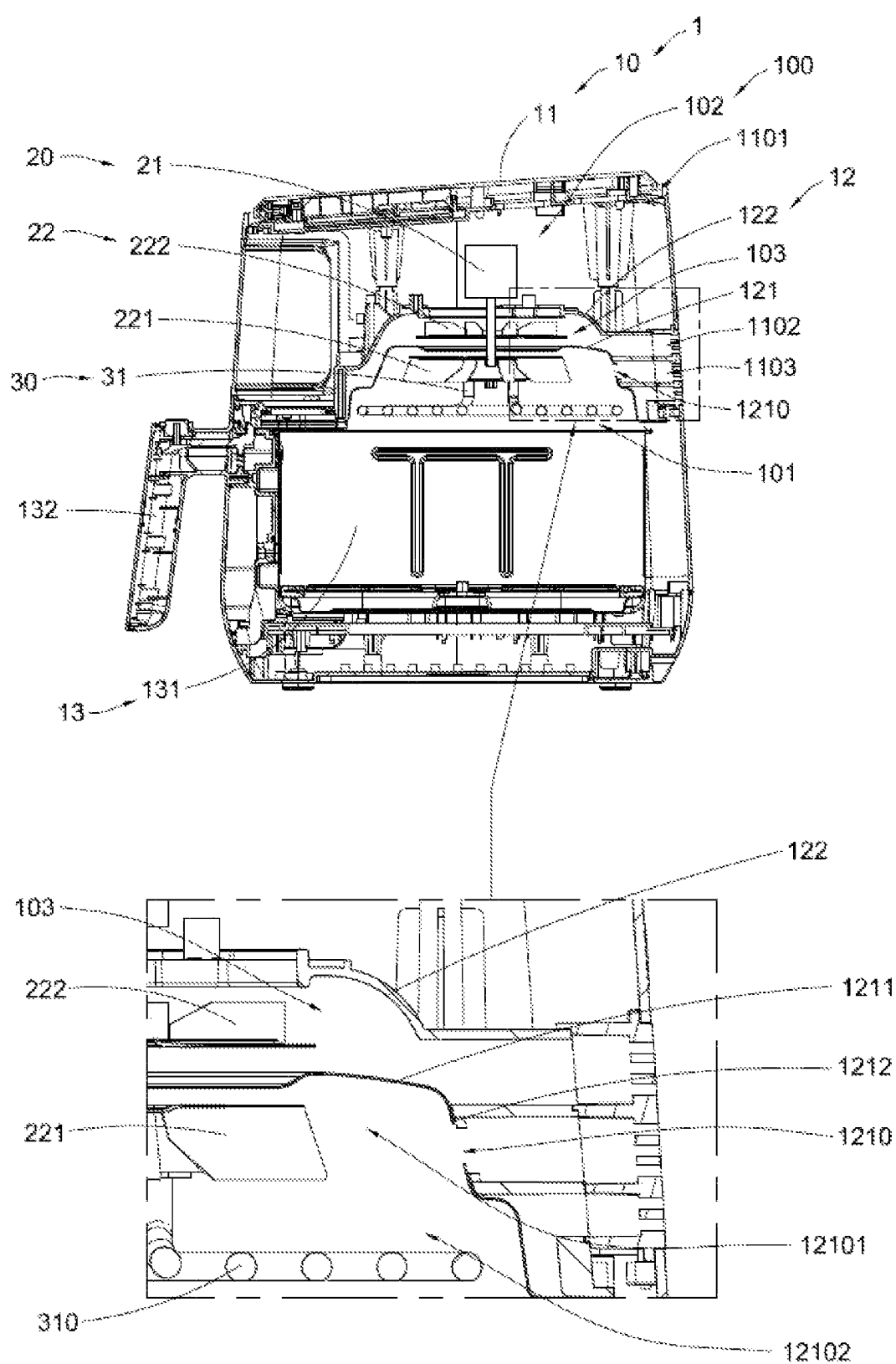
FIG. 3 is a sectional view of the air fryer according to the above first preferred embodiment of the present invention.

Particularly, as shown in FIG. 3, the main body 10 comprises a housing 11 defining an interior cavity 100, a cover assembly 12, and an air frying assembly 13. The cover assembly 12 is disposed in the interior cavity 100 of the housing 11 to divide the interior cavity 100 into the air frying chamber 101 and a component chamber 102 thereabove. The air frying assembly 13 is disposed in the housing 11 for holding the food in the air frying chamber 101, such that when the air is heated by the air heat 30, the hot air is blown by the air circulation device 20 to circulate the hot air in the air frying chamber 101 so as to air-fry the food therein.

It is worth mentioning that the air frying chamber 101 and the component chamber 102 of the main body 10 are independent and sealed from each other, wherein when the air temperature in the air frying chamber 101 is increased by the air heater 30, i.e. the hot air, moisture of the food will be removed by the hot air, such that a high temperature and humid environment will be created in the air frying chamber 101. On the other hand, since the component chamber 102 is independent and sealed from the air frying chamber 10, the hot air will not enter into the component chamber 102. Therefore, the component chamber 102 will maintain its low air temperature environment to prevent any components in the component chamber 102 being damaged by high heat so as to prolong the service life span of the air fryer 1 and to ensure the safety thereof.

Preferably, the air frying assembly 13 is detachably coupled to the housing 11 for easily reaching the food in the air frying assembly 13. In one example, the air frying assembly 13 is detachably coupled to the housing 11 by means of, but not limited to, snap fit or lock structure.

Figure 4:
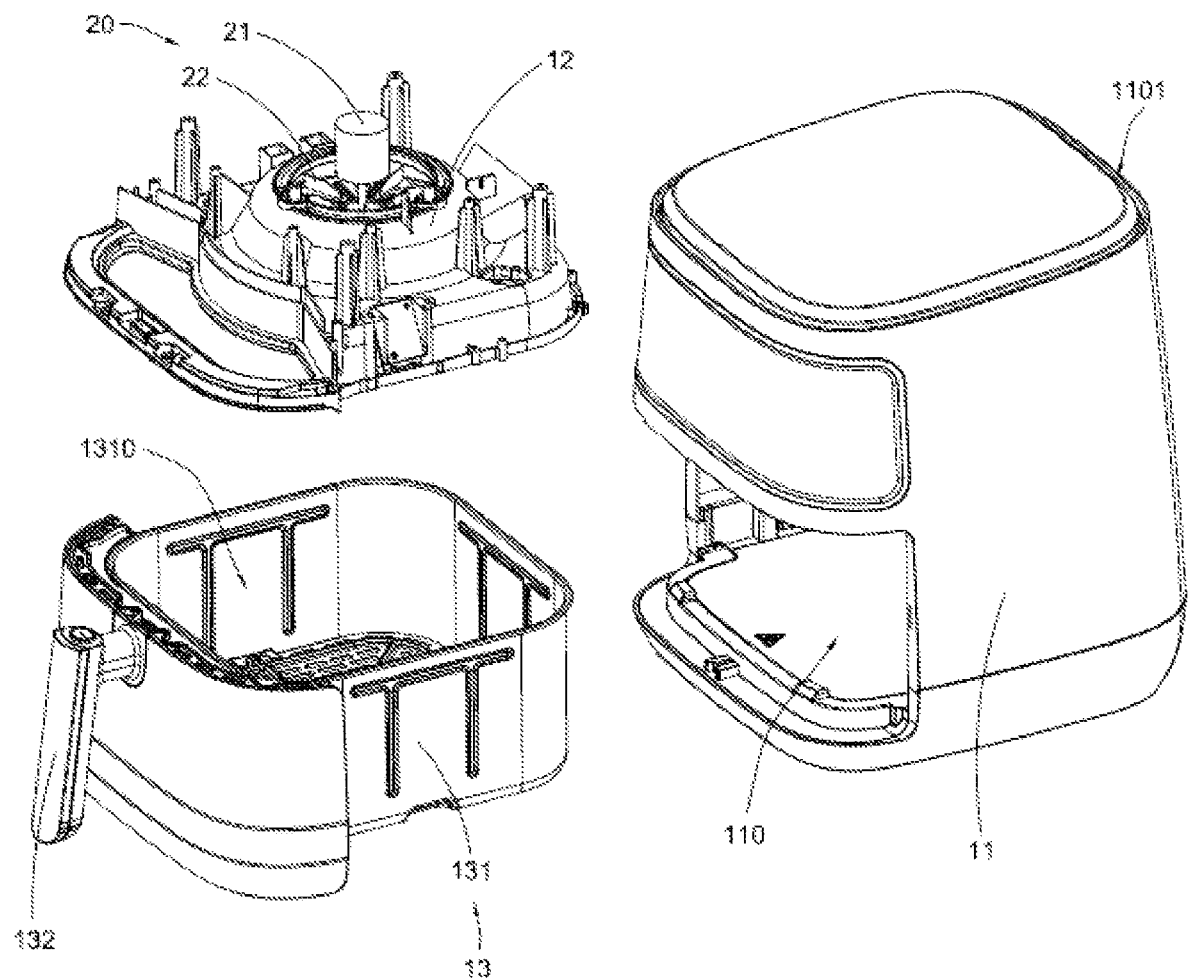
FIG. 4 is an exploded perspective view of the air fryer according to the above first preferred embodiment of the present invention.

Preferably, as shown in FIG. 4, the air frying assembly 13 comprises a basket 131 having at least one basket opening 1310, wherein the basket 131 is arranged for holding the food therein to be placed in the air frying chamber 101 when the basket 131 is coupled to the housing 11. The basket opening 1310 is arranged to communicate with the air frying chamber 101, wherein the hot air heated by the air heater 30 can be circulated in the basket 131 via the air circulation device 20 to contact with the food so as to air-fry the food. It is appreciated that the basket 131 can be a net-shaped basket such as a frying basket with a meshing structure.

Preferably, the air frying assembly 13 further comprises a handle 132 extended from the basket 131, wherein the housing 11 further has an accessing opening 110 communicating with the air frying chamber 101, such that when the basket 131 is placed in the air frying chamber 101 through the accessing opening 110, the accessing opening 110 of the housing 11 is sealed by the basket 131 and the handle 132 is located out of the housing 11 for the user to carry the basket 131.

It is worth mentioning that even though the air fryer 1 of the present invention is constructed to have an inner container structure as an example to show the distinctive features, the structural configuration of the air frying assembly 13 should not be limited in the present invention, such as the temperature control of the present invention. For example, the air frying assembly 13 can incorporate with different components such as rotating grill, skewers and other cooking components, as long as the food can be air-fried in the air frying chamber 101.

As shown in FIGS. 3 to 7, according to the preferred embodiment, the heating element 31 of the air heater 30 comprises a heating coil 310 arranged in such manner that when the heating coil 310 is electrically powered on, the heating coil 310 is arranged to convert electric energy to heat energy to heat up the surrounding air to enter into the air frying chamber 101. Particularly, the air heater 30 further comprises a power supply 32 supported in the main body 10 within the component chamber 102 thereof for electrically connecting to a power outlet. The heating coil 310 is detachably coupled at the cover assembly 12 and is disposed in the air frying chamber 101 of the main body 10. When the heating coil 310 is detachably mounted at the cover assembly 12, the heating coil 310 is electrically connected to the power supply 32, such that when the heating coil 301 is electrically powered by the power supply 32, the heating coil 310 is able to convert electric energy to heat energy to heat up the surrounding air to circulate in the air frying chamber 101.

Figure 5:
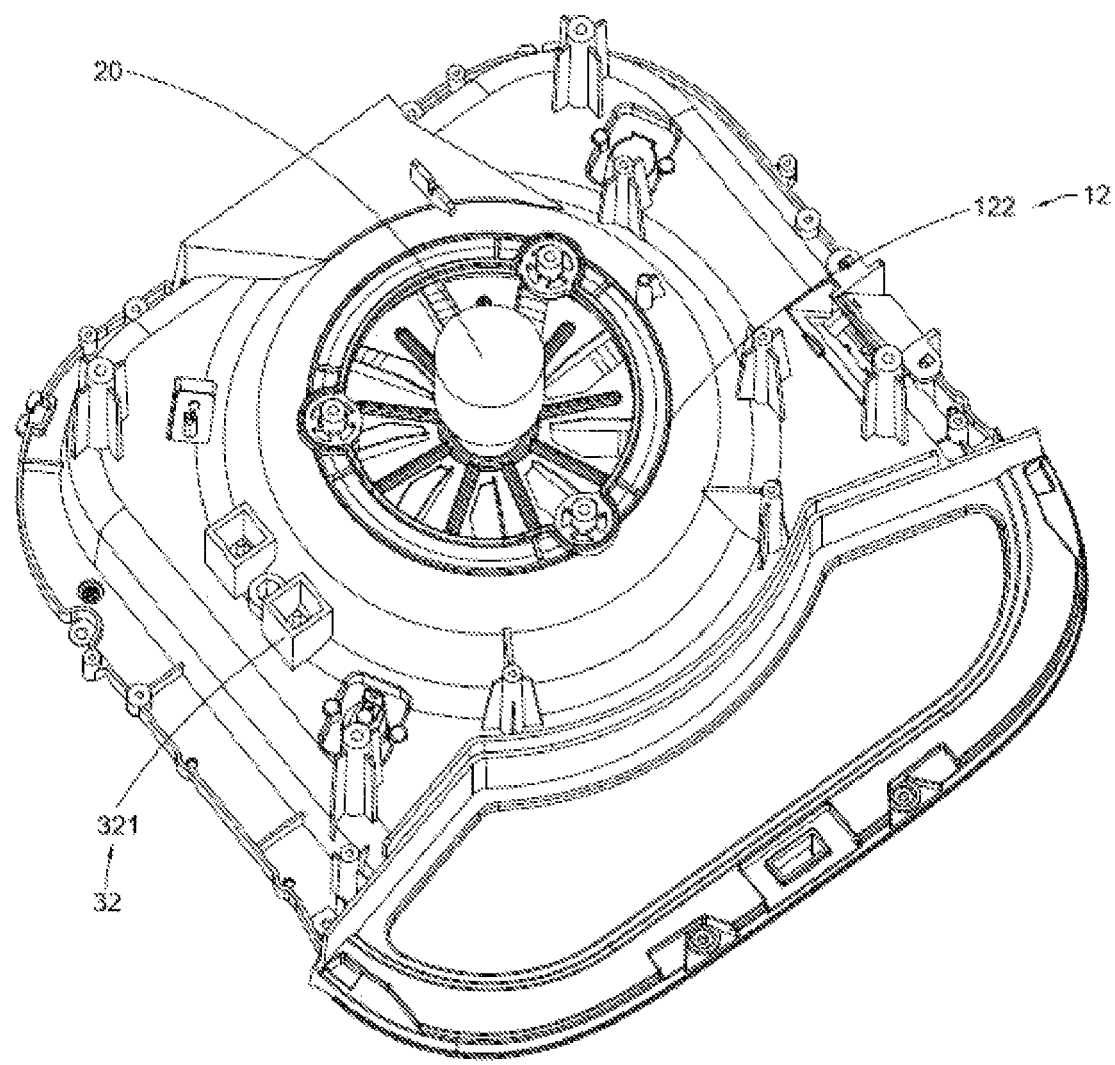
FIG. 5 is a top perspective view of a cover assembly of the air fryer according to the above first preferred embodiment of the present invention.

As an example shown in FIG. 5, the power supply 32 comprises a power port 321 provided at the cover assembly 12. The heating coil 310 comprises a coil body 311 and a power connector 312 integrally coupled to the coil body 311, wherein the power connector 312 is detachably connected to the power port 321 in order to electrically connect the coil body 311 to the power supply 32. Such plug-in connection of the power connector 312 and the power port 321 allows the heating coil 310 to be electrically connected to the power supply 32 when the heating coil 310 is mounted at the cover assembly 12. It is appreciated that in another embodiment, the locations of the power connector 312 and the power port 321 are interchangeable that the power connector 312 can form at the power supply 32 and the power port 321 can form at the heating element 310 in order to provide such plug-in connection. The purpose of the plug-in connection is to detachably connect the heating element 310 to the power supply 32. In addition, the power supply 32 can be, but not limited to, a power plug or a power socket for electrically connecting to the external power outlet. The power supply 32 can also be a built-in battery adapted for being charged.

It is worth mentioning that the coil body 311 of the heating coil 310 has a spiral shape, wherein the power connector 312 is connected at one end of the coil body 311. As a result, the heating coil 310 cannot be stably supported at the cover assembly 12 by only inserting the power connector 312 into the power port 321. For example, the heating coil 310 will be vibrated or even fallen off during the operation of the air fryer 1. In order to solve this problem, as shown in FIGS. 3 and 6, the main body 10 of the air fryer 1 further comprises one or more detachable holders 14 provided at the cover assembly 12 to detachably couple the heating coil 310 at the cover assembly 12 so as to stably retain the heating coil 310 in the air frying chamber 101.

Figure 6:
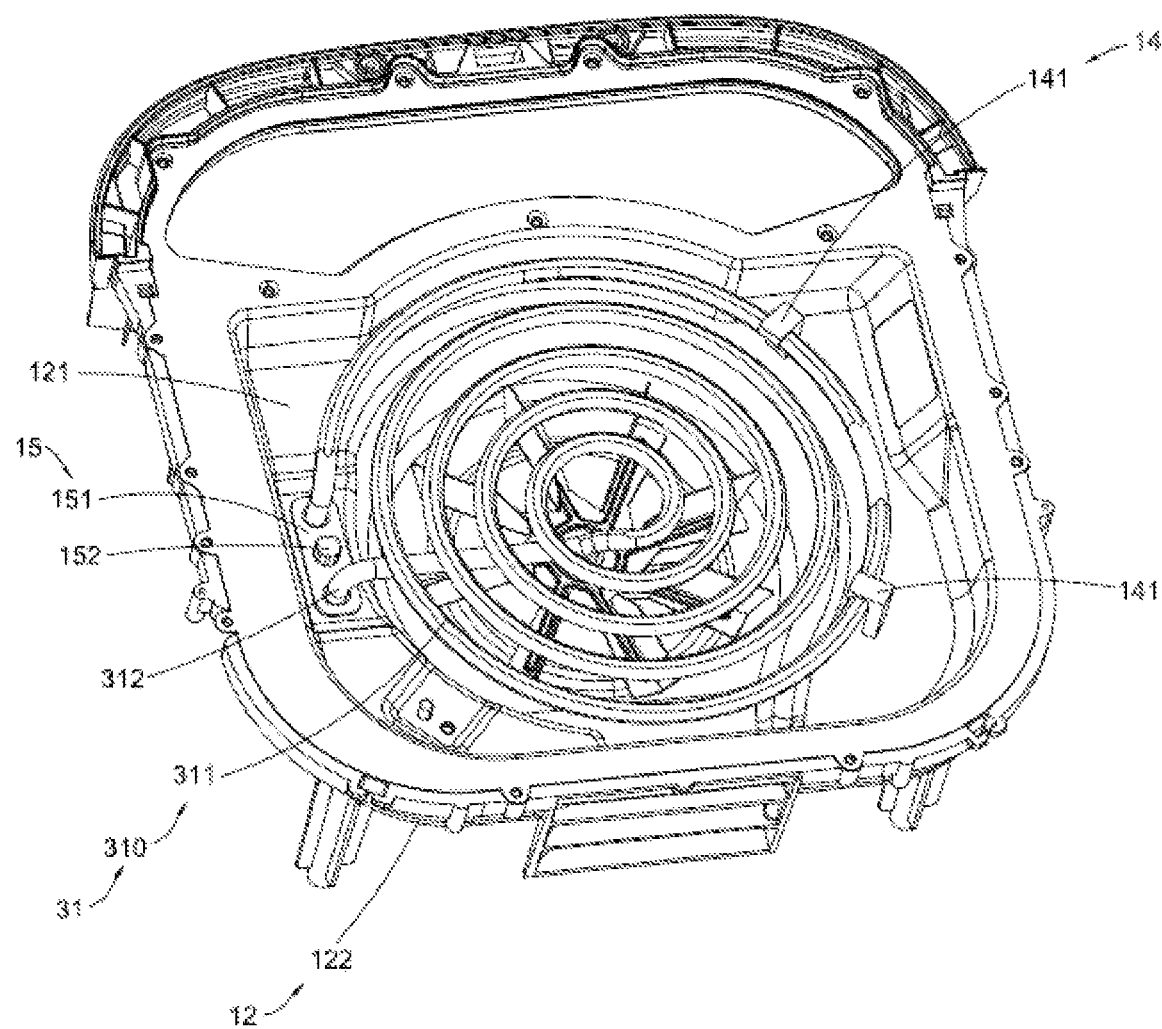
FIG. 6 is a rear perspective view of the cover assembly of the air fryer according to the above first preferred embodiment of the present invention.
Figure 8:
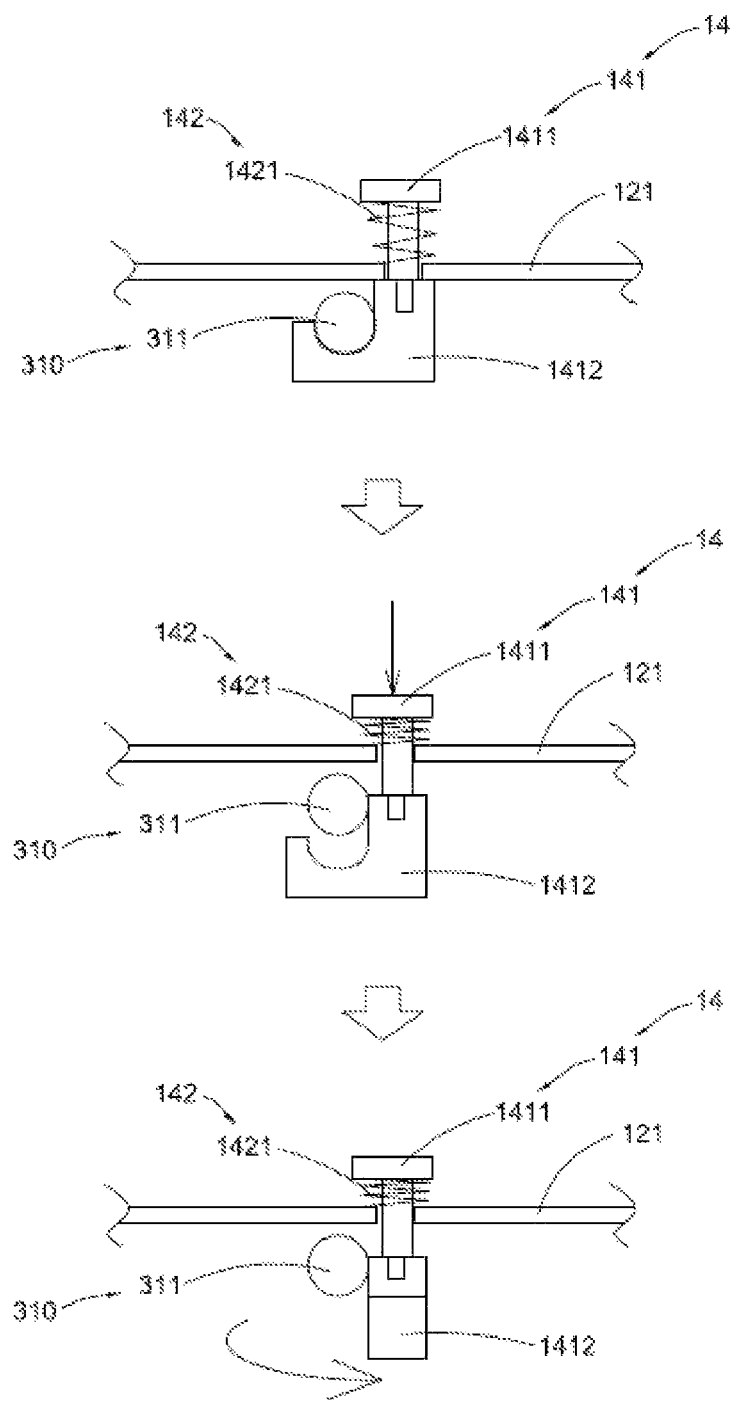
FIG. 8 illustrates an operation of a detachable assembly of the air fryer according to the above first preferred embodiment of the present invention.

Particularly, as shown in FIGS. 6 and 8, each of the detachable holders 14 comprises a supporting element 141 movably coupled at the cover assembly 12 to move between a supporting position and a releasing portion. When the supporting element 141 is moved at the supporting position, the coil body 311 is supported by the supporting element 141 to stably retain the heating coil 310 in the air frying chamber 101. When the supporting element 141 is moved at the releasing position, the coil body 311 can be detached from the supporting element 141, such that the heating coil 310 can be detached from the air frying chamber 101 for cleaning purpose.

Preferably, the detachable holder 14 further comprises a restoring element 142 coupled between the supporting element 141 and the cover assembly 12 for applying a restoring force to the supporting element 141 so as to move the supporting element 141 from the releasing position back to the supporting position. In other words, the restoring element 142 is configured to retain the supporting element 141 at the supporting position. Therefore, the assembly and disassembly operation of heating coil 310 will be substantially simplified.

For example as shown in FIG. 8, the restoring element 142 is embodied as a spring 1421, wherein the supporting element 141 has a sliding end 1411 and a hooking end 1412 extended from the sliding end 1411. The sliding end 1411 of the supporting element 141 is slidably coupled at the cover assembly 12 while the hooking end 1412 of the supporting element 141 is extended toward the air frying chamber 101 to detachably engage with the coil body 311 of the heating coil 310. The spring 1421 has one end biasing against the sliding end 1411 of the supporting element 141 and an opposed end biasing against the cover assembly 12 for applying a spring force as the restoring force to push the hooking end 1412 of the supporting element 141 toward the cover assembly 12, such that the coil body 311 of the heating coil 310 is stably held at the hooking end 1412 of the supporting element 141 for preventing any vibration or falling off of the heating coil 310.

Accordingly, in order to disassemble the heating coil 310, the user is able to pull down and rotate the hooking end 1412 of the supporting element 141, such that the hooking end 1412 of the supporting element 141 will be disengaged with the coil body 311 of the heating coil 310. Then, the power connector 312 can be detached from the power port 321 of the power supply 32, such that the heating coil 310 is entirely detached from the air frying chamber 101. In order to assemble the heating coil 310, the power connector 312 of the heating coil 310 can be firstly connected to the power port 321 of the power supply 32. Then, by pulling down and rotating the hooking end 1412 of the supporting element 141, the coil body 311 of the heating coil 310 can be coupled at the hooking end 1412 of the supporting element 141. It is worth mentioning that the restoring element 142 is arranged to move the supporting element 141 from the releasing position back to the supporting position to prevent the coil body 311 being detached from the hooking end 1412 of the supporting element 141 accidentally or unintentionally. Therefore, the assembling and disassembling operations of the heating coil 310 are simple and easy.

It is worth mentioning that in the above example of the present invention, the spring 1421 is preferably located in the component chamber 102 of the main body 10, wherein the spring 1421 is embodied as a compression spring for applying outward pushing spring forces at the two ends. In another example, the spring 1421 can be disposed in the air frying chamber 101 of the main body 10, wherein the spring 1421 can be a tension spring for applying inward pulling forces at the two ends.

Furthermore, since the power port 321 of the power supply 32 is extended facing toward the air frying chamber 101, the power connector 312 of the heating coil 310 can be easily connected to the power port 321. However, even though the power port 321 is engaged with the power connector 312, the hot air in the air frying chamber 101 may still able to enter into the power port 321 to cause serious safety problem. In order to solve this problem, as shown in FIGS. 6 and 9, the main body 10 further comprises a blocking assembly 15 provided at the power connector 312 of the heating coil 310, wherein after the power connector 312 of the heating coil 310 is connected to the power port 321 of the power supply 32, the power port 321 is sealed by the blocking assembly 15 to prevent the hot air from the air frying chamber 101 entering into the power port 321, so as to prevent any short-circuit or other electrical accidents.

Figure 9:
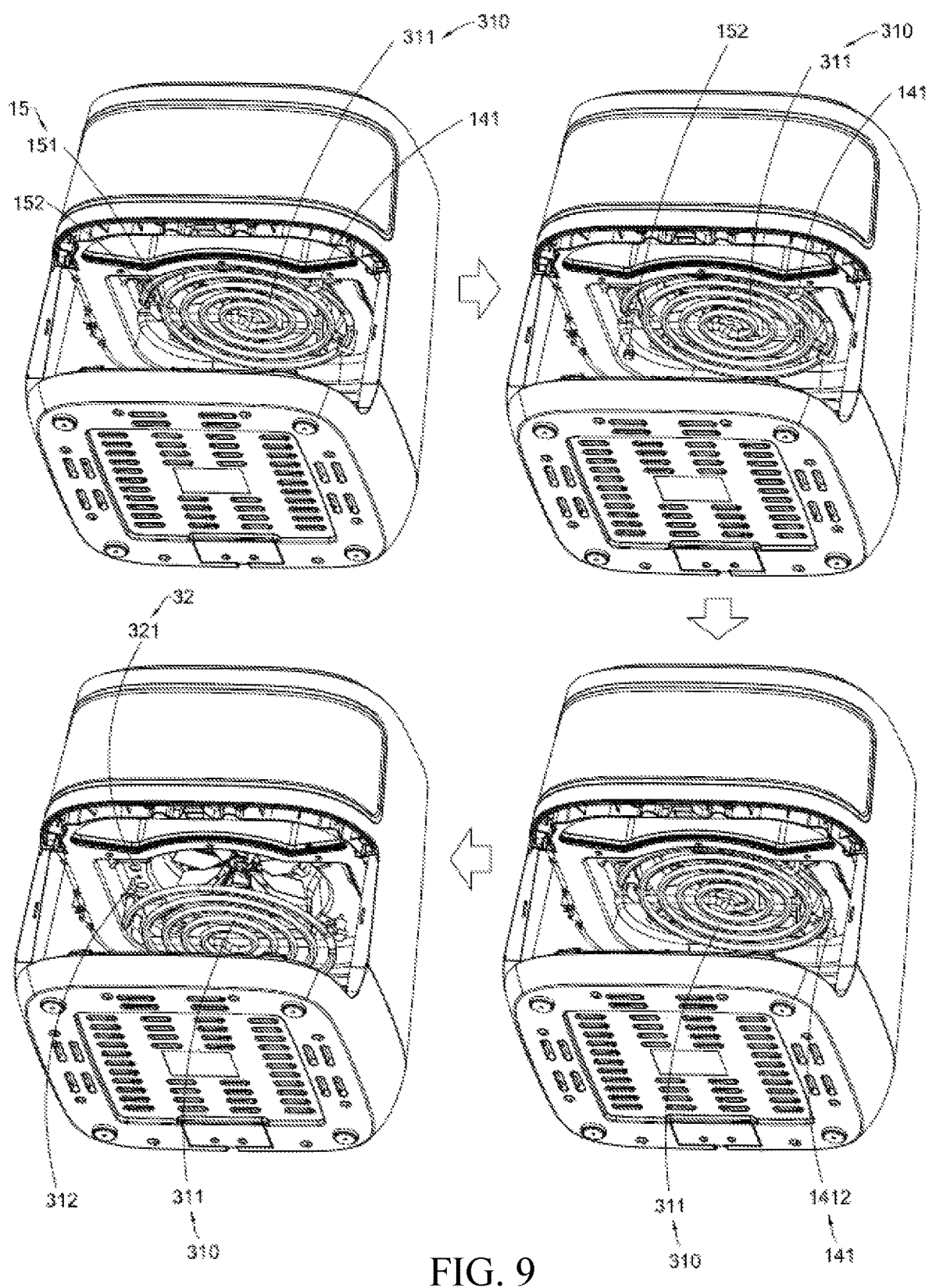
FIG. 9 illustrates a detaching operation of the air fryer according to the above first preferred embodiment of the present invention.

For example as shown in FIG. 9, the blocking assembly 15 comprises a sealing gasket 151 and a hand screw 152, wherein the sealing gasket 151 is provided at the power connector 312 of the heating coil 310. After the power connector 312 of the heating coil 310 is inserted into the power port 321 of the power supply 32, the sealing gasket 151 is tightly mounted at the power port 321 by the hand screw 152. Therefore, the blocking assembly 15 can securely seal the power port 321 and, at the same time, the power connector 312 of the heating coil 310 can be securely engaged with the power port 321 of the power supply 32, so as to ensure the electrical connection between the heating coil 310 and the power supply 32. It is worth mentioning that for disassembling the heating coil 32, the user is able to manually actuate the hand screw 152 to remove the hand screw 152 for detachably unplugging the power connector 312 of the heating coil 310 from the power port 321 of the power supply 32. Therefore, the assembling and disassembling operations of the heating coil 310 do not require any tool to assemble and disassemble operations of the heating coil 310.

According to the first preferred embodiment, as shown in FIG. 3, the air circulation device 20 of the air fryer 1 comprises an electric motor 21 and a fan blade assembly 21 being driven to rotate by the electric motor 21, wherein the electric motor 21 is supported at the component chamber 102 of the main body 10. The fan blade assembly 22 comprises a first fan blade 221 supported at the air frying chamber 101 and driven to rotate by the electric motor 21 for circulating the air within the air frying chamber 101. It is appreciated that the air circulation device 20 can be embodied as a fan provided outside the main body 10, wherein the fan is connected to the air frying chamber 101 through an air circulation duct, such that the air in the air frying chamber 101 can be circulated via the fan.

Preferably, the first fan blade 221 of the fan blade assembly 22 is located between the cover assembly 12 and the heating coil 310 to prevent the heating coil 310 from interfering with the rotational movement of the first fan blade 221 and to ensure the air blown by the first fan blade 221 and being heat by the heating coil 310 before entering into the air frying chamber 101.

It is worth mentioning that since the electric motor 21 of the air circulation device 20 is supported at the component chamber 102 while the first fan blade 221 is supported at the air frying chamber 101, when the first fan blade 221 is driven by the electric motor 21 to circulate the hot and humid air in the air frying chamber 101, the electric motor 21 is kept in a relatively dry and cool environment in the component chamber 102, so as to prolong the service life span of the air circulation device 20 and to ensure safety operation of the air circulation device 20.

Preferably, as shown in FIGS. 3 to 7, the cover assembly 12 comprises an inner cover 121 and an outer cover 122, wherein the inner and outer covers 121, 122 are spaced apart from each other and are disposed in the interior cavity 100 of the housing 11 to form an intermediate chamber 103 between the air frying chamber 101 and the component chamber 102. In other words, the interior cavity 100 are sequentially divided by the inner and outer covers 121, 122 into the air frying chamber 101, the intermediate chamber 103, and the component chamber 102, such that the intermediate chamber 103 serves as a heat isolation chamber to block the heat from the air frying chamber 101 to the component chamber 102, so as to avoid the electric motor 21 of the air circulation device 20 being operated in a high temperature environment. In other words, the cover assembly 12 has a hollow structure that the intermediate chamber 103 is formed between the inner and outer covers 121, 122 as a heat-insulation and moisture-proof space between the air frying chamber 101 and the component chamber 102, so as to ensure the component chamber 102 providing a dry and low temperature environment.

Preferably, the fan blade assembly 22 comprises a second fan blade 222 disposed in the intermediate chamber 103, wherein the second fan blade 222 is drive to rotate by the electric motor 21, the second fan blade 222 is configured to generate an air flow in the intermediate chamber 103 so as to enhance the heat insulation and moisture proof of the intermediate chamber 103. It is appreciated that the first and second fan blades 221, 222 are coupled at the same output shaft of the electric motor 21, wherein the second fan blade 222 is located between the first fan blade 221 and the electric motor 21. In other words, the first fan blade 221 is located out of the intermediate chamber 103, wherein the first fan blade 221 serves as an outer fan blade while the second fan blade 222 serves as an inner fan blade.

Preferably, the intermediate chamber 103 of the main body 10 is communicated with the component chamber 102 thereof, wherein the main body 10 further has at least one air inlet 1101 provided at the housing 11 to communicate with the component chamber 102, and at least one first air outlet 1102 provided at the housing 11 to communicate with the intermediate chamber 103. Therefore, when the second fan blade 222 of the fan blade assembly 22 is operated, exterior cold air will be sucked into the component chamber 102 through the air inlet 1101 of the housing 11, and will then enter into intermediate chamber, and will be discharged from the first air outlet 1102. As a result, the heat, such as generated by the electric motor 21, in the component chamber 102 will be discharged to maintain the dry and low temperature environment of the component chamber 102.

It is worth mentioning that during the operation of the air fryer 1 for air-frying the food, moisture and grease will be generated and released as a side product in the air frying chamber 101, such that the circulating air will carry moisture and grease in the air frying chamber 101. Once the amount of moisture and grease is gradually accumulated in the air frying chamber 101, the moisture and grease will affect the air-frying effect of the air fryer 1. In order to reduce the moisture and grease carried by the air flowing in the air frying chamber 101, the main body 10 of the air fryer 1 further has second air outlet 1103 provided at the housing 11 to communicate with the air frying chamber 101, wherein the first fan blade 221 is operated for blowing out the hot air carrying the moisture and grease out of the air frying chamber 101 through the second air outlet 1103. It is appreciated that the air frying chamber 101 of the main body 10 can communicate with the air inlet 1101 of the housing 11, such that when the first fan blade 221 is operated, fresh air can be supplied to the air frying chamber 101 through the air inlet 1101.

Preferably, as shown in FIG. 3, the inner cover 121 has an air outlet passage 1210, wherein the air frying chamber 101 is communicated with the second air outlet 1103 through the air outlet passage 1210, such that when the first fan blade 221 of the fan blade assembly 22 is operated, a portion of the hot air in the air frying chamber 101 will circulate therein while another portion of the hot air will be discharged out of the air frying chamber 101 through the air outlet passage 1210.

Preferably, a size of the air outlet passage 1210 of the inner cover 121 is gradually reduced from the air frying chamber 101 to the second air outlet 1103, in order to increase a connection area between the air outlet passage 1210 and the air frying chamber 101 while keeping the second air outlet 1103 unchanged. Therefore, more amount of hot air carrying the moisture and grease can be discharged out of the air frying chamber 101 when the first fan blade 221 is operated. At the same time, the connection area between the air outlet channel 1210 and the air frying chamber 101 becomes larger, to easily clean up the grease stains in the air outlet passage 1210.

For example as shown in FIGS. 3 to 7, the inner cover 121 is coupled in the outer cover 122 to form the intermediate chamber 103 between an inner surface of the outer cover 122 and an outer surface of the inner cover 121. The inner cover 121 further has a dome shaped covering portion 1211 and a communicating portion 1212, wherein the covering portion 1211 of the inner cover 121 forms a ceiling of the air frying chamber 101 while the communicating portion 1212 is integrally extended from the covering portion 1211 to the second air outlet 1103 of the housing 11 to form the air outlet passage 1210.

Figure 7:
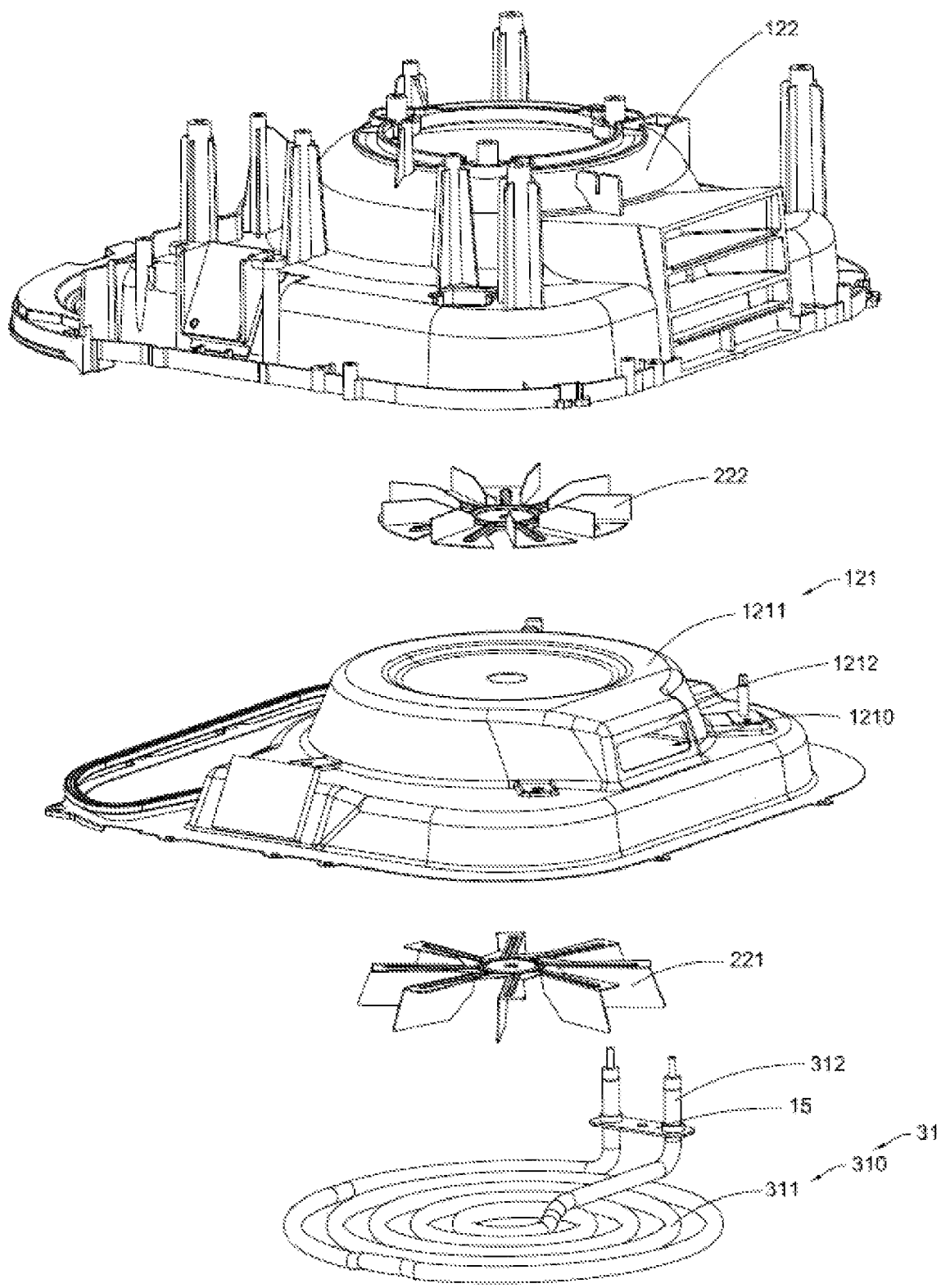
FIG. 7 is an exploded perspective view of a cover assembly of the air fryer according to the above first preferred embodiment of the present invention.
Figure 10:
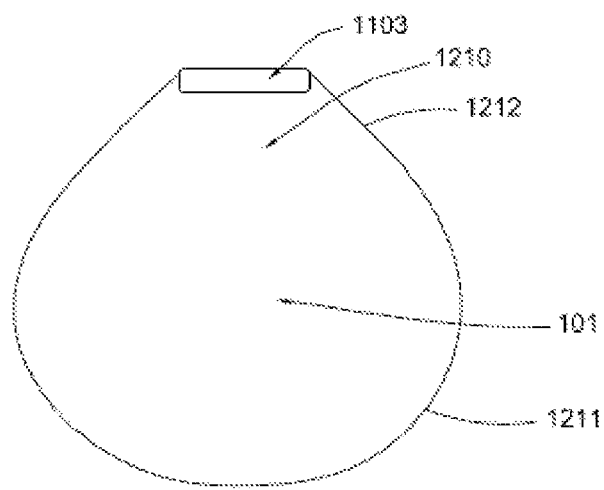
FIG. 10 is a top view of an inner cover of the cover assembly of the air fryer according to the above first preferred embodiment of the present invention.

Preferably, as shown in FIGS. 7 and 10, a side wall of the communicating portion 1212 of the inner cover 121 is tangent to a peripheral wall of the covering portion 1211 thereof to form a streamline structure between the covering portion 1211 and the communicating portion 1212 so as to guide the hot air in the air frying chamber 101 being charged through the air outlet passage 1210. It is appreciated that the connection between the covering portion 1211 and the communicating portion 1212 is smooth to prevent any grease stain being accumulated and to enhance the cleaning operation.

Preferably, the second air outlet 1103 of the housing 11 is located adjacent to the first air outlet 1102, such that the hot air discharged through the second air outlet 1103 will be mixed with the cold air discharged through the first air outlet 1102 to reduce an overall temperature of the air discharged from the main body 10. Such configuration will prevent the hot air from being discharged separately through the second air outlet 1103, which may cause safety concern.

Preferably, the covering portion 1211 of the inner cover 121 of the cover assembly 12 has a stepping structure to define a first receiving cavity 12101 for receiving the first fan blade 221 and a second receiving cavity 12102 for receiving the heating coil 310, wherein the first receiving cavity 12101 is located above and communicated with the second receiving cavity 12102. A diameter of the second receiving cavity 12102 is larger than a diameter of the first receiving cavity 12101, wherein when the heating coil 310 is detachably coupled at the inner cover 121, the heating coil 310 will not block the rotational movement of the first fan blade 221. Meanwhile, the air outlet passage 1210 of the inner cover 121 is communicatively extended from the side wall of the first receiving cavity 12101 to the second air outlet 1103 to discharge the hot air in the air frying chamber 101 through the second air outlet 1103 under the centrifugal action of the first fan blade 221.

As shown in FIG. 1, the air fryer 1 according to the first preferred embodiment further comprises a control system 40 and a temperature sensor 50 operatively connected to the control system 40. The temperature sensor 50 is disposed in the air frying chamber 101 of the main body 10 to detect the air temperature in the air frying chamber 101 in a real time manner and to transmit the detected temperature data to the control system 40. Accordingly, in response to the detected temperature data, the control system 40 is configured to control the operation of the air circulation device 20 and the air heater 30. It is appreciated that the temperature sensor 50 can be, but not limited to, a NTC temperature sensor.

Preferably, the temperature sensor 50 is located adjacent to the heating coil 310 of the air heater 30 so as to accurately detect the temperature of the air circulating in the air frying chamber 101 in a real time manner.

It is worth mentioning that the control system 40 of the air fryer 1 of the present invention can be embodied as, but not limited to, a single-chip microcomputer or a control chip, wherein the single-chip microcomputer or control chip is disposed the component chamber 102 of the main body 10, such that the air fryer 1 forms an integrated device. It is appreciated that, in another example, the control system 40 can also be embodied as a control terminal as an external component of the air fryer 1, such that the air fryer 1 serves as a split device.

Figure 11:
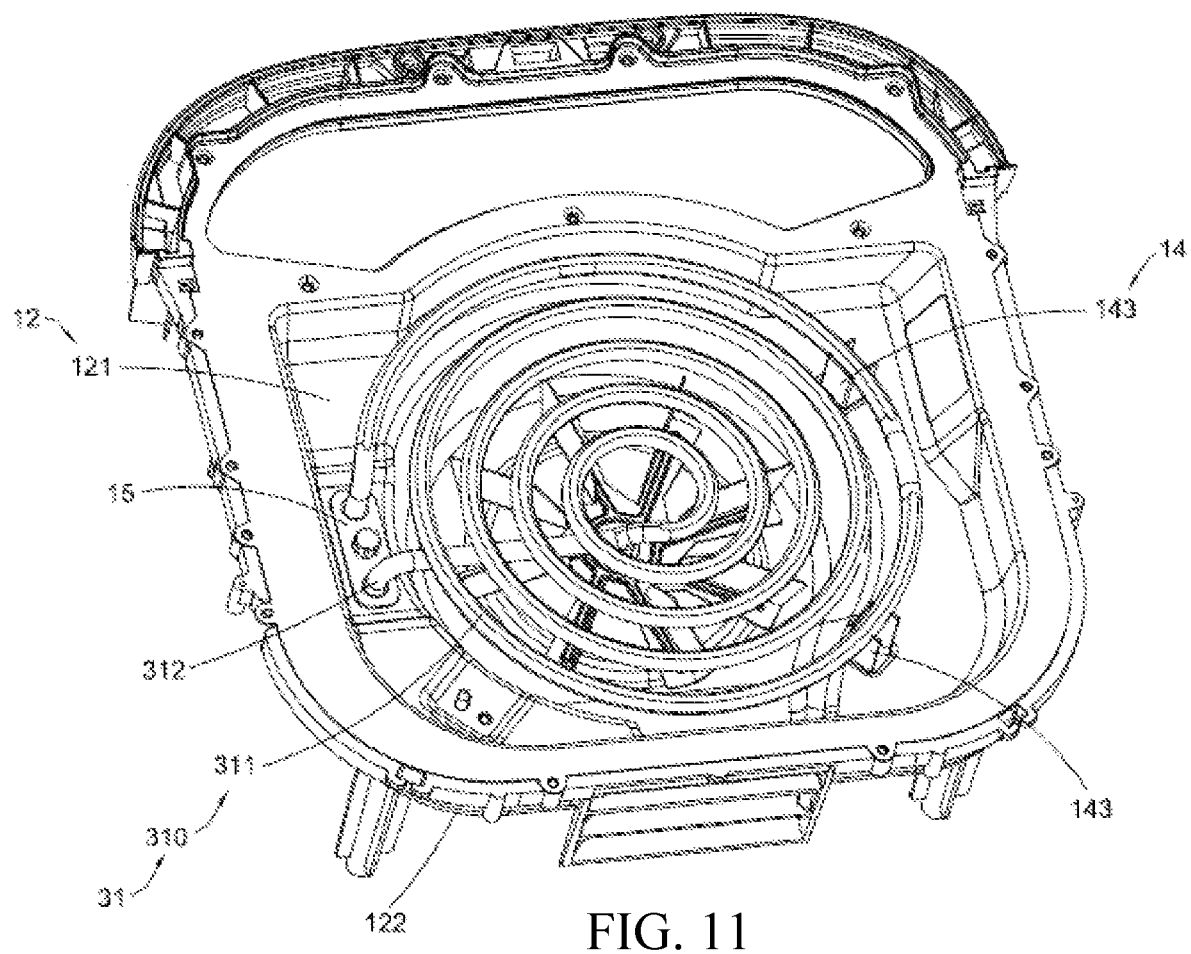
FIG. 11 illustrates an alternative mode of the air fryer according to the above first preferred embodiment of the present invention.

FIG. 11 illustrates an alternative mode of the air fryer 1 of the first preferred embodiment as a modification thereof, wherein, comparing to the first preferred embodiment, the detachable holder 14 in the alternative mode is modified as a magnetic element 143 provided at the coil body 311 of the heating coil 31, such that the heating coil 310 is detachably mounted at the cover assembly 12 by means of magnetic attraction.

In one example the inner cover 121 of the cover assembly 12 is made of a magnetic attracting material to detachably and magnetically couple the heating coil 310 to the inner cover 121. It is worth mentioning that, in the above example, the inner cover 121 can be made of magnetic attracting material such as carbon steel. In another example, the inner cover 121 can also be made of non-magnetic material such as aluminum, stainless steel, etc. Accordingly, one or more magnetic attraction elements can be placed at the desired position of the inner cover 121 to magnetically couple with the heating coil 310 when the inner cover 121 is made of non-magnetic material. Alternatively, the magnetic element 143 can be directly mounted to the inner cover 121 at a predetermined location to magnetically couple with the heating coil 310.

It is worth mentioning that the heating coil 310 of the air fryer 1 according to the above first embodiment of the present application and its alternative mode is detachably coupled to the cover assembly 12, wherein the inner surface of the inner cover 121 will not be blocked after the heating coil 310 is detached, such that the user is able to easily clean the inner surface of the inner cover 121. However, since the grease stains are difficult to clean, cleaning detergents may need to apply for removing the grease stains.

Figure 12:
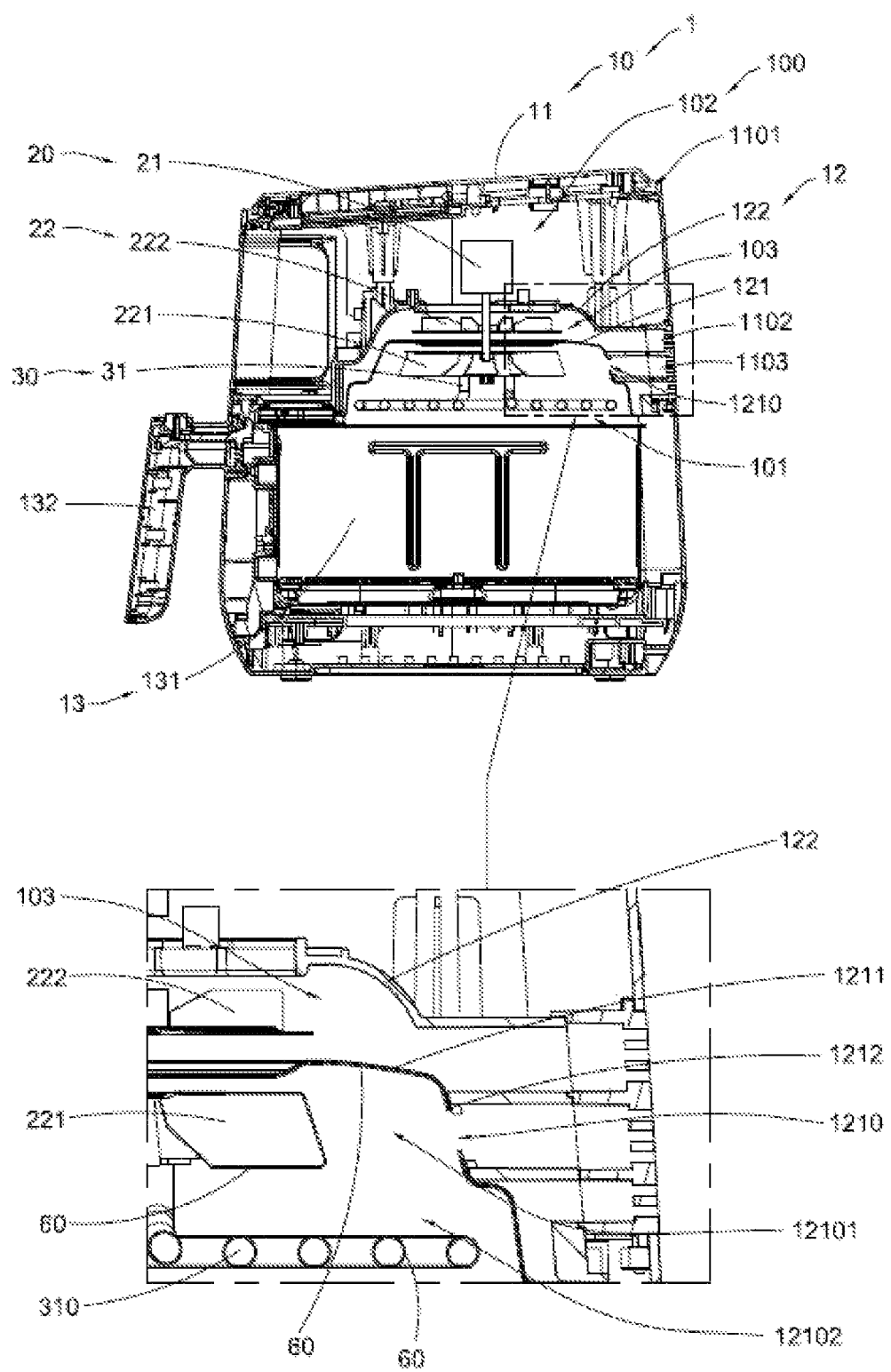
FIG. 12 is a sectional view of the air fryer according to a second preferred embodiment of the present invention.

As shown in FIG. 12, the air fryer according to a second preferred embodiment is illustrated as another modification of the first preferred embodiment. Particularly, comparing the first embodiment with the second embodiment, the difference between the first and second embodiments is that the air fryer 1 further comprises a non-stick coating 60 partially or entirely provided at the inner wall surface of the air frying chamber 101 of the main body 10. The non-stick coating 60 not only reduces the grease stains being adhered to the inner wall surface of the air frying chamber 101 but also allows the grease stains being easily removed from the inner wall surface of the air frying chamber 101, so as to ensure the sanitation of the air fryer. It is appreciated that the non-stick coating 60 can be embodied as, but not limited to, a Teflon coating or a ceramic coating.

Preferably, the inner surface of the inner cover 121 of the cover assembly 12 is also coated with the non-stick coating 60 to reduce the grease stains adhered to the inner surface of the inner cover 121.

Preferably, the outer surface of the coil body 311 of the heating coil 310 is further coated with the non-stick coating 60 to reduce the grease stains adhered on the outer surface of the heating tube body 311.

Preferably, the outer surface of the first fan blade 221 of the fan blade assembly 22 can further be coated with the non-stick coating 60 to reduce the grease stains on the outer surface of the first fan blade 221.

It is worth mentioning that, in another example, the non-stick coating 60 can also be coated on the main body 10 at the location where the hot air in the air frying chamber 101 will reach and contact.

As shown in FIG. 13, the present invention further provides a cleaning method of the air fryer, which comprises the following steps.

S100: Detach the heating coil 310 of the air heater 30 of the air fryer 1 from the air frying chamber 101 of the main body 10 of the air fryer 1.

S200: Remove grease stains on the inner wall surface of the air frying chamber 101 and the outer surface of the heating coil 310 after the heating coil 310 is detached.

S300: Couple the heating coil 310 back into the air frying chamber 101 after the heating coil 310 and the air frying chamber 101 are cleaned.

It is worth mentioning that the non-stick coating 60 can be partially or completely coated on the inner wall surface of the air frying chamber 101 to enhance the cleaning process of the air fryer 1. It is appreciated that the outer surface of the heating coil 310 can also be coated with the non-stick coating 60.

It is appreciated that the terms "devices", "equipments", "systems", "module" and "unit" in the description and block diagram of the present invention are merely illustrative examples and are not intended to be connected, arranged, and configured in the manner shown in the block diagrams. A person who skilled in the art should will recognize, these devices, equipments, systems, modules and unit can be connected, arranged, and configured in any manner. The terms "include", "include", "have", etc. are open end and mean "including but not limited to" and can be used interchangeably. The terms "or" and "and" as used herein refer to the terms "and/or" and can be used interchangeably, unless the context clearly indicates otherwise. The term "such as" used herein refers to the phrase "such as but not limited to" and can be used interchangeably.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An air fryer for air-frying a food, comprising:
   a main body comprising one or more detachable holders,
      a housing having an interior cavity and a cover assembly disposed in said interior cavity to divide said interior cavity into an air frying chamber for receiving the food therein and a component chamber above said air frying chamber;

an air circulation device disposed in said main body and configure to guide an airflow to circulate in the said air frying chamber of said main body; and an air heater which comprises a heating coil detachably coupled in said main body for heating the airflow to form a hot air in said air frying chamber so as to air-fry the food therein and a power supply supported in said component chamber to detachably and electrically connected to said heating coil, wherein said heating coil is detachably coupled at said cover assembly to support said heating coil in said air frying chamber and electrically connected to said power supply, wherein said power supply comprises a power port provided at said cover assembly, wherein said heating coil comprises a coil body and a power connector integrally coupled to said coil body, wherein said power connector is detachably connected to said power port in order to electrically connect said coil body to said power supply when said heating coil is detachably coupled at said cover assembly, wherein said one or more detachable holders are provided at said cover assembly to detachably couple said coil body of said heating coil at said cover assembly and each comprises a magnetic element provided at said coil body of said heating coil, such that said heating coil is detachably and magnetically mounted at said cover assembly.

2. The air fryer, as recited in claim 1, wherein said main body further comprises a blocking assembly provided at said power connector of said heating coil, wherein after said power connector of said heating coil is connected to said power port of said power supply, said power port is sealed by said blocking assembly.

3. The air fryer, as recited in claim 1, wherein said detachable holder comprises a supporting element movably coupled at said cover assembly to move between a supporting position and a releasing portion, wherein when said supporting element is moved at said supporting position, said coil body is supported by said supporting element to stably retain said heating coil in said air frying chamber, and when said supporting element is moved at said releasing position, said coil body is detached from said supporting element, such that said heating coil is adapted to be detached from said air frying chamber.

4. The air fryer, as recited in claim 3, wherein said detachable holder further comprises a restoring element coupled between said supporting element and said cover assembly for applying a restoring force to said supporting element so as to move said supporting element from said releasing position back to said supporting position.

5. The air fryer, as recited in claim 4, wherein said restoring element comprises a spring having two ends biasing against said supporting element and said cover assembly respectively for applying a spring force as said restoring force to said supporting element.

6. The air fryer, as recited in claim 5, wherein said supporting element has a sliding end slidably coupled at said cover assembly, and a hooking end extended from said sliding end toward said air frying chamber to detachably engage with said coil body of said heating coil.

7. The air fryer, as recited in claim 1, wherein said air circulation device comprises an electric motor supported at said component chamber of said main body, and a fan blade assembly, wherein said fan blade assembly comprises a first fan blade supported at said air frying chamber and driven to rotate by said electric motor for circulating the air flow within said air frying chamber.

8. The air fryer, as recited in claim 7, wherein said first fan blade is located between said cover assembly and said heating coil.

9. The air fryer, as recited in claim 8, wherein said cover assembly comprises an inner cover and an outer cover, wherein said inner and outer covers are spaced apart from each other and are disposed in said interior cavity of said housing to form an intermediate chamber between said air frying chamber and said component chamber, wherein said fan blade assembly further comprises a second fan blade disposed in said intermediate chamber, wherein said second fan blade is drive to rotate by said electric motor.

10. The air fryer, as recited in claim 9, wherein said intermediate chamber of said main body is communicated with said component chamber thereof, wherein said main body further has at least one air inlet provided at said housing to communicate with said component chamber, and at least one first air outlet provided at said housing to communicate with said intermediate chamber.

11. The air fryer, as recited in claim 10, wherein said main body further has second air outlet provided at said housing to communicate with said air frying chamber, wherein said second air outlet is located adjacent to said first air outlet.

12. The air fryer, as recited in claim 11, wherein said inner cover has an air outlet passage extended from said air frying chamber to said second air outlet.

13. The air fryer, as recited in claim 12, wherein said inner cover further has a covering portion and a communicating portion, wherein said covering portion of said inner cover forms a ceiling of said air frying chamber while said communicating portion is integrally extended from said covering portion to said second air outlet of said housing to form said air outlet passage.

14. The air fryer, as recited in claim 13, wherein said covering portion of the inner cover of said cover assembly has a stepping structure to define a first receiving cavity for receiving said first fan blade and a second receiving cavity for receiving said heating coil, wherein said first receiving cavity is located above and communicated with said second receiving cavity, wherein a diameter of said second receiving cavity is larger than a diameter of said first receiving cavity.

15. The air fryer, as recited in claim 9, further comprising a non-stick coating provided at an inner wall surface of said air frying chamber of said main body.

* * * * *